US011601148B2

(12) United States Patent
Pick et al.

(10) Patent No.: US 11,601,148 B2
(45) Date of Patent: Mar. 7, 2023

(54) UE REPORTING FOR IMPROVING BASE STATION PRECODING

(71) Applicant: QUALCOMM Incorporated, San Diego, CA (US)

(72) Inventors: Jacob Pick, Beit Zait (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/202,197

(22) Filed: Mar. 15, 2021

(65) Prior Publication Data
US 2022/0294481 A1   Sep. 15, 2022

(51) Int. Cl.
| H04B 1/10 | (2006.01) |
| H04W 72/04 | (2009.01) |
| H04L 25/03 | (2006.01) |
| H04L 27/26 | (2006.01) |

(52) U.S. Cl.
CPC ..... *H04B 1/1027* (2013.01); *H04L 25/03968* (2013.01); *H04L 27/2647* (2013.01); *H04W 72/0413* (2013.01)

(58) Field of Classification Search
CPC ................ H04L 1/0026; H04L 5/0057; H04L 25/03968; H04L 27/2647; H04B 7/0417; H04B 1/1027; H04W 72/0413
See application file for complete search history.

(56) References Cited

U.S. PATENT DOCUMENTS

| 2013/0107805 | A1* | 5/2013 | Luo ...................... H04J 11/0023 370/328 |
| 2013/0344909 | A1* | 12/2013 | Davydov ................ H04L 1/003 455/501 |
| 2016/0088646 | A1* | 3/2016 | Sun ........................ H04L 1/0026 370/329 |
| 2017/0244513 | A1* | 8/2017 | Pitakdumrongkija ....................... H04B 7/0617 |
| 2019/0021092 | A1* | 1/2019 | Fakoorian ............. H04L 5/0048 |
| 2021/0218483 | A1* | 7/2021 | Fang ..................... H04L 1/0041 |

* cited by examiner

*Primary Examiner* — Sung S Ahn
(74) *Attorney, Agent, or Firm* — Procopio, Cory, Hargreaves & Savitch LLP

(57) ABSTRACT

Apparatus, methods, and computer program products for improving precoding downlink signaling are provided. An example method may include determining one or more noise covariance parameters for a noise covariance report, the noise covariance parameters being associated with a noise covariance matrix for whitening. The example method further may include transmitting, to a base station, the noise covariance report including the one or more noise covariance parameters or a noise whitening matrix for the whitening, the noise covariance report being transmitted based on a transmission periodicity of one or more slots.

30 Claims, 9 Drawing Sheets

| Number of Blocks | Number of RBs at each block | Number of Antennas $N_{RX}$ | Reporting of Each Block | | |
|---|---|---|---|---|---|
| | | | $[R_{nn}(k)]_{00}$ | $[R_{nn}(k)]_{01}$ | $[R_{nn}(k)]_{0(NRX-1)}$ |
| | | | $[R_{nn}(k)]_{10}$ | $[R_{nn}(k)]_{11}$ | $[R_{nn}(k)]_{1(NRX-1)}$ |
| | | | ⋮ | ⋮ | ⋮ |
| | | | | | $[R_{nn}(k)]_{(NRX-1)(NRX-1)}$ |

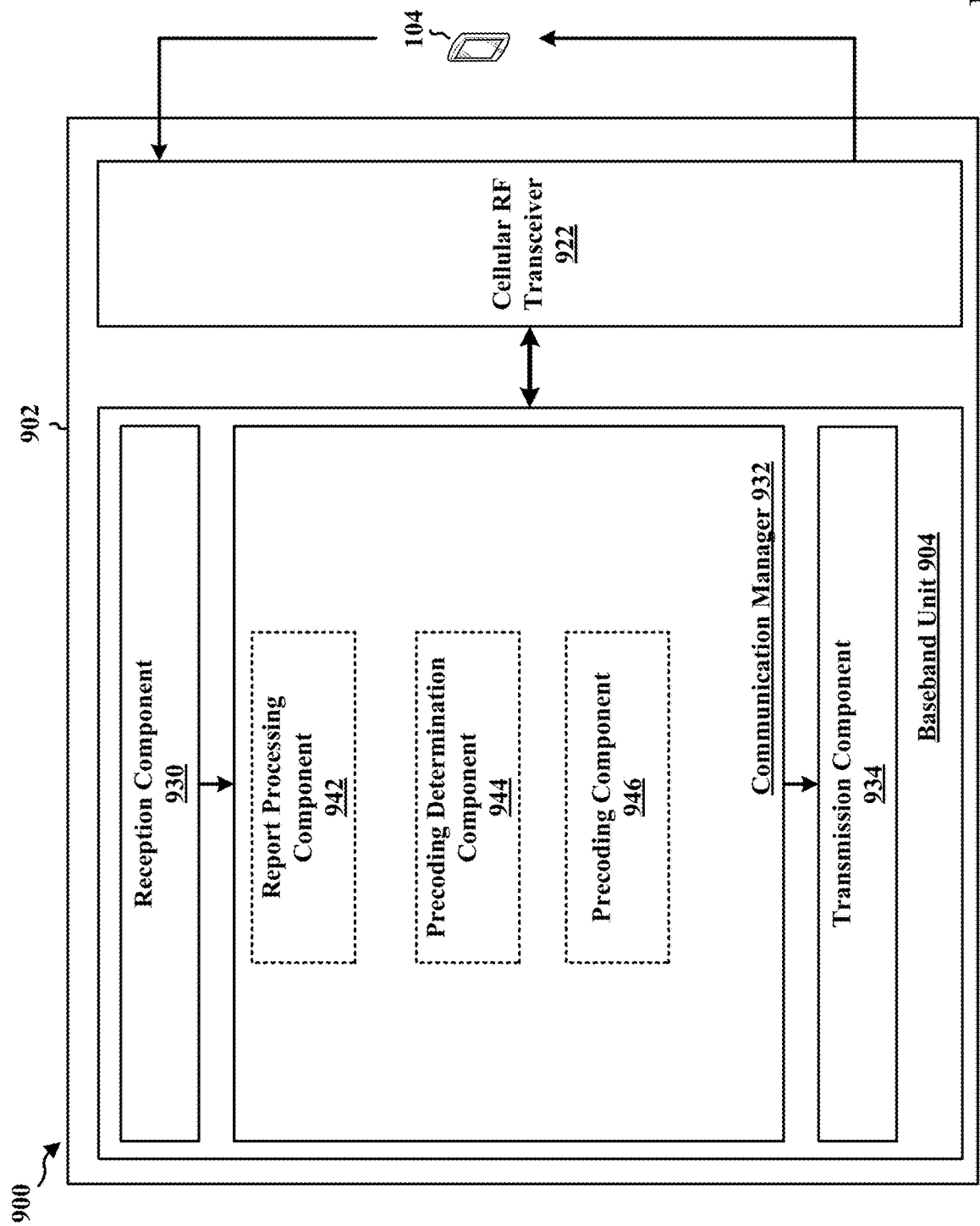

UE REPORTING FOR IMPROVING BASE STATION PRECODING

BACKGROUND

Technical Field

The present disclosure relates generally to communication systems, and more particularly, to wireless communication systems with precoding.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new specifications associated with latency, reliability, security, scalability (e.g., with Internet of Things (IoT)), and other specifications. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus of a user equipment (UE) are provided. The apparatus may be configured to determine one or more noise covariance parameters for a noise covariance report, the noise covariance parameters being associated with a noise covariance matrix for whitening. The apparatus may be further configured to transmit, to a base station, the noise covariance report including the one or more noise covariance parameters or a noise whitening matrix for the whitening, the noise covariance report being transmitted based on a transmission periodicity of one or more slots.

In another aspect of the disclosure, a method, a computer-readable medium, and an apparatus of a base station are provided. The apparatus may be configured to receive, from a UE, a noise covariance report including one or more noise covariance parameters or a noise whitening matrix for whitening, the noise covariance report being received based on a reception periodicity of one or more slots, the noise covariance parameters being associated with a noise covariance matrix for the whitening. The apparatus may be further configured to determine a downlink precoding based on the noise covariance report including the one or more noise covariance parameters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 is a diagram illustrating an example noise covariance report.

FIG. 9 is a diagram illustrating an example of a hardware implementation for an example apparatus.

DETAILED DESCRIPTION

Figure 1:
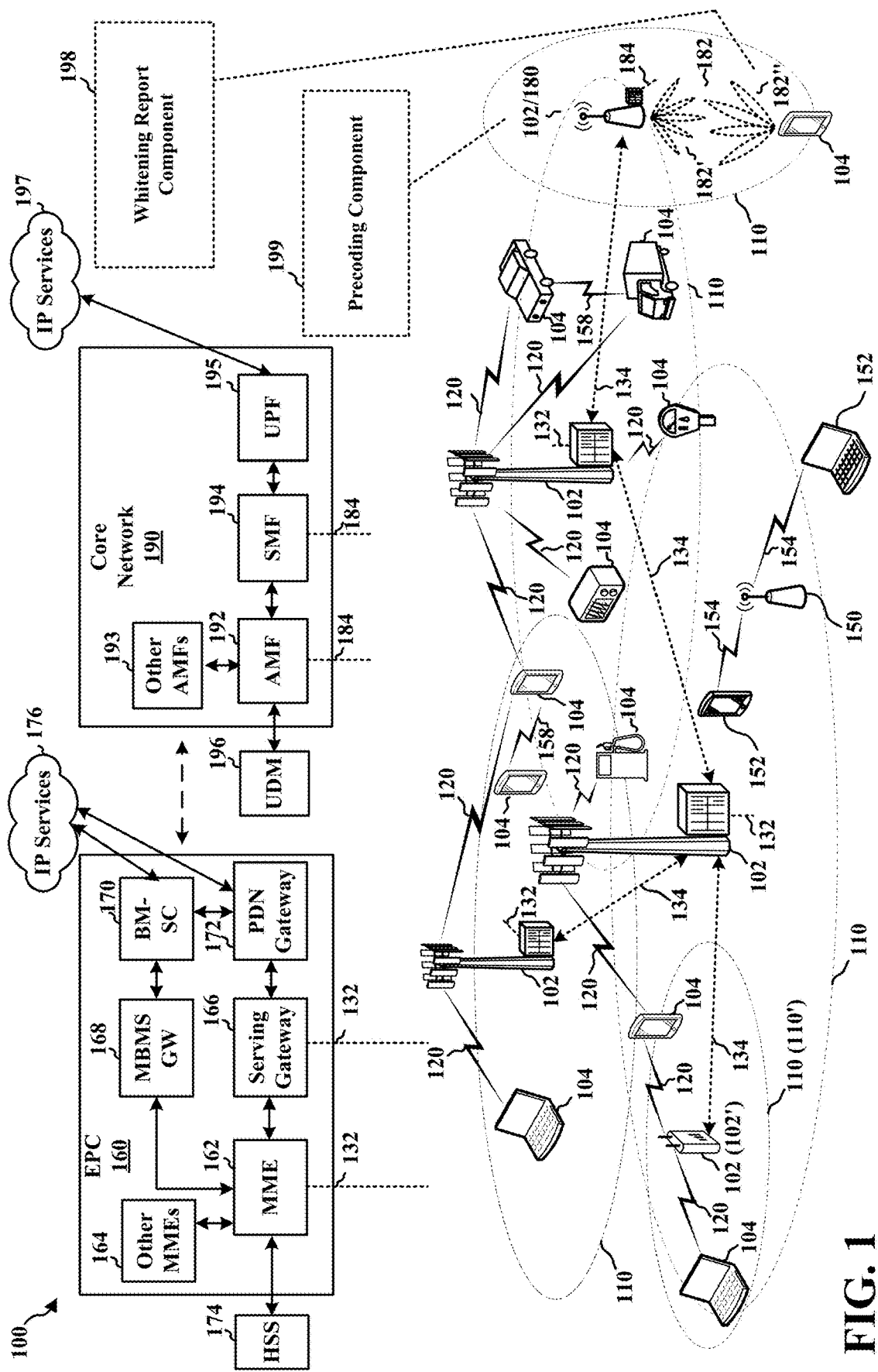
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a whitening report component 198. In some aspects, the whitening report component may be configured to determine one or more noise covariance parameters for a noise covariance report, the noise covariance parameters being associated with a noise covariance matrix for whitening. In some aspects, the whitening report component may be further configured to transmit, to a base station, the noise covariance report including the one or more noise covariance parameters or a noise whitening matrix for the whitening, the noise covariance report being transmitted based on a transmission periodicity of one or more slots. In certain aspects, the base station 180 include a precoding component 199. In some aspects, the precoding component 199 may be configured to receive, from a UE, a noise covariance report including one or more noise covariance parameters or a noise whitening matrix for whitening, the noise covariance report being received based on a reception periodicity of one or more slots, the noise covariance parameters being associated with a noise covariance matrix for the whitening. In some aspects, the precoding component 199 may be further configured to determine a downlink precoding based on the noise covariance report including the one or more noise covariance parameters.

Although the following description may be focused on 5G NR, the concepts described herein may be applicable to other similar areas, such as LTE, LTE-A, CDMA, GSM, and other wireless technologies.

Figure 2:
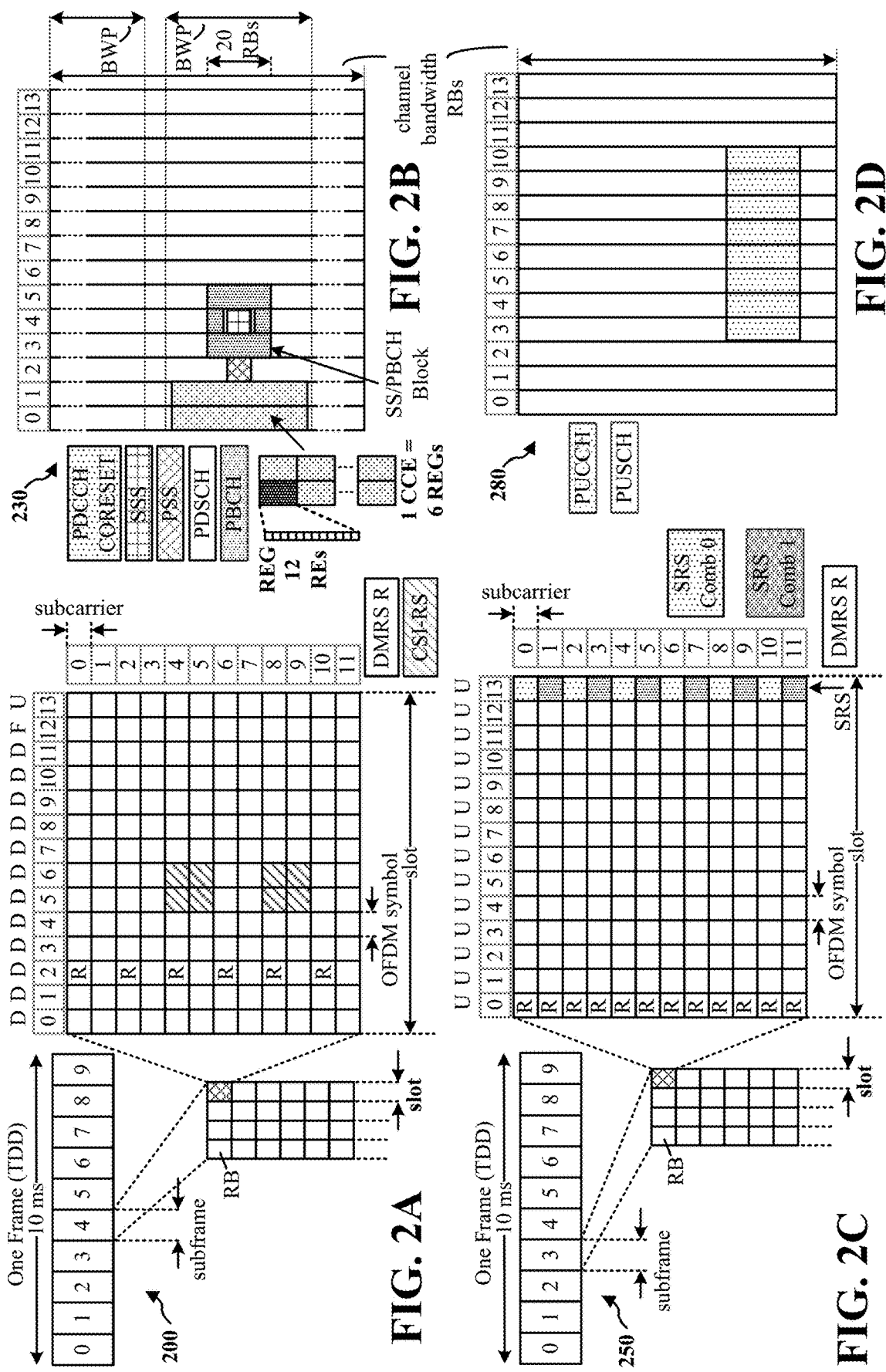
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS)

may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame.

The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
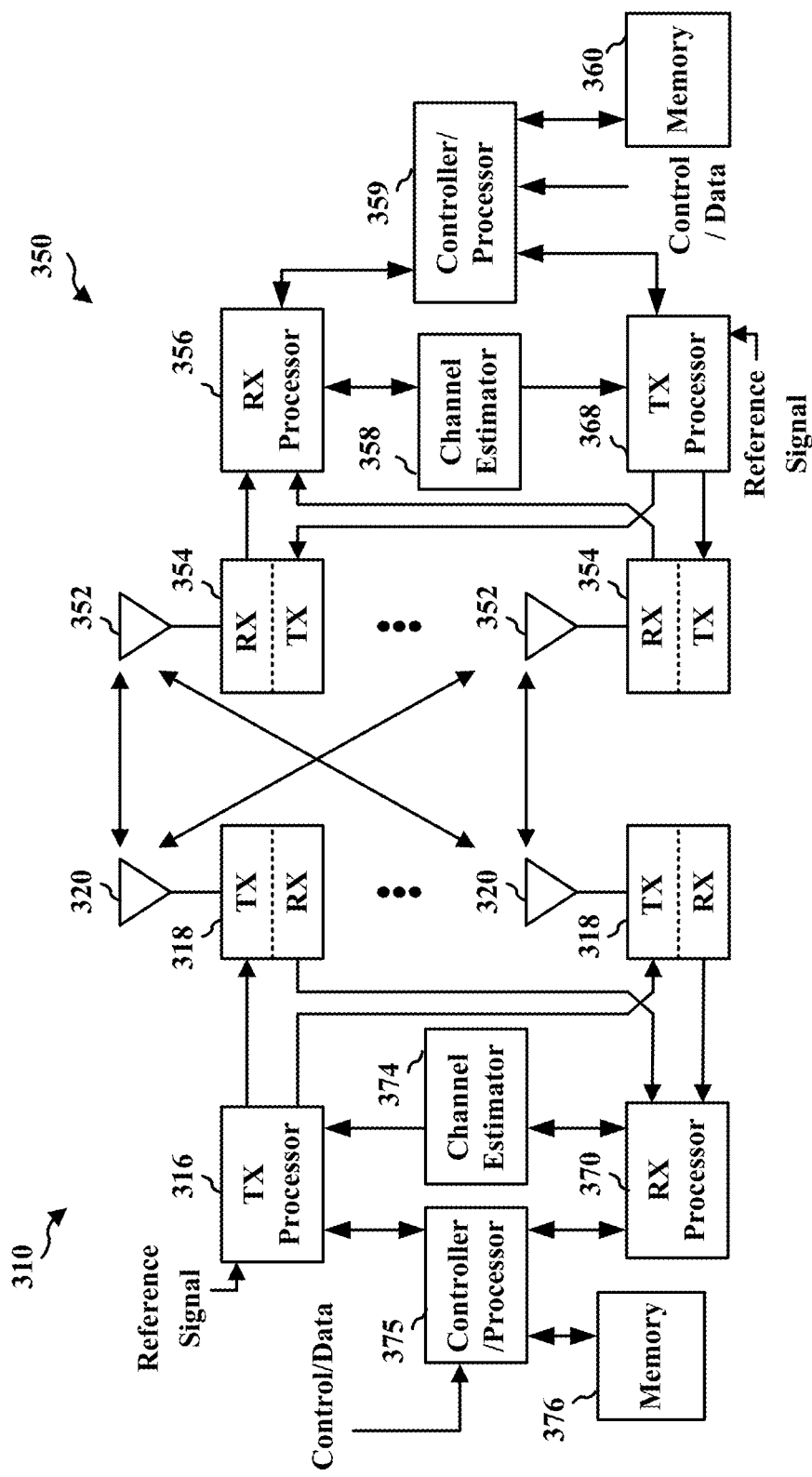
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with whitening report component 198 of FIG. 1.

At least one of the TX processor 316, the RX processor 370, and the controller/processor 375 may be configured to perform aspects in connection with precoding component 199 of FIG. 1.

Downlink (DL) precoding may be used in some wireless communication systems, such as wireless communication systems that include MIMO and UE semi-persistent scheduling (SRS) in uplink (UL) communications. In some wireless communication systems, a base station may assume reciprocity of the UL and DL channels and calculate the precoding based on that channel. Aspects provided herein may improve precoding by reporting information such as the UE noise covariance or the noise whitening matrix to the base station. The base station may have a correct knowledge of the true equivalent channel observed by the UE receiver and may adjust its precoding accordingly. In other words, the base station may have correct knowledge of the channel that the UE receiver observes after performing noise whitening on the channel.

In one example, a UE may receive a signal at one or more resource elements (REs), which may be represented by: $\vec{y}=HP\vec{x}+\vec{\eta}$. Also, $\vec{y}$ may be a vector $[N_{Rx}\times 1]$ and may denote the received signal on each of the receiving antennas of the UE. H may be a matrix $[N_{Rx}\times N_{Tx}]$ and may denote the channel matrix of the channel at which the UE receives the signal. $N_{Rx}$ may denote the number of receiving (RX) antennas of the UE and $N_{Tx}$ may denote the number of transmitting (TX) antennas of the base station. P may be a matrix $[N_{Tx}\times N_L]$ and may denote the precoding matrix to which the base station applies precoding of the signal. Further, $\vec{x}$ may be a vector $[N_L\times 1]$ and may denote the vector of a number of N layers $N_L$ of transmitted quadrature amplitude modulation (QAM) symbols. QAM is a method of combining at least two amplitude modulated signals into a single channel using at least two carriers, each having the same frequency but differing in phase (e.g., by ninety degrees or a quarter of a cycle).

Additionally, $\vec{\eta}$ may denote the received noise vector $[N_{Rx}\times 1]$ of length equal to the number of Rx antennas associated with the UE. In some instances, $\vec{\eta}$ may be assumed by the UE to be ~$CN(0, R_{nn})$. CN may denote complex normal distribution (otherwise referred as complex Gaussian distribution). The noise may be a complex circular Gaussian noise. For example, the real and imaginary parts of the noise vector may be jointly normal. A mean associated with the noise may be zero. The noise covariance may be denoted by $R_{nn}$.

At a receiver of the UE, the UE may, before equalizing and decoding the received signal, whiten the received signal to generate a whitened signal, $\vec{\tilde{y}}$, by multiplying a whitening matrix, W, with the received signal: $\vec{\tilde{y}}=W\vec{y}=WHP\vec{x}+W\vec{\eta}=\tilde{H}P\vec{x}+\vec{\tilde{\eta}}$. The whitening process may cause the noise covariance to be whitened (i.e., effectively whitened for the receiver and further processing). The whitening matrix may be derived based on the noise covariance $R_{nn}$. For example, $W^+\times W$ may be equal to $R_{nn}$. $W^+$ may denote the Hermitian transpose (e.g., complex element of each element of the transpose) of the whitening matrix. By whitening the matrix, the whitened noise, $\vec{\tilde{\eta}}$, may be ~$CN(0, I)$. Also, the mean associated with the whitened noise $\vec{\tilde{\eta}}$ may be zero (0). The noise covariance associated with the whitened noise $\vec{\tilde{\eta}}$ may be equal to the identity matrix I. As used herein, $\tilde{H}$ (i.e., the channel observed by the receiver of the UE after applying the noise whitening matrix) may be referred as a "whitened channel."

In some aspects, a base station may use a precoder in order to precode a downlink signal. For example, a singular value decomposition (SVD) precoder used by the base station may set the precoding matrix, P, to be equal to a value V. A base station may singular value decompose the channel matrix H. The channel H may be singular value decomposed to be $H=UDV^H$, where $U^HU=I$ and $V^HV=I$. U may be a unitary matrix $[N_{Rx}\times N_{Rx}]$ (i.e., a complex square matrix where its conjugate transpose is also its inverse) associated with a number of receiving antennas $N_{Rx}$ (where the dimension is equal to the number of receiving antennas at the UE). $U^H$ may denote a Hermitian transpose of U. V may be a unitary matrix $[N_{Tx}\times N_{Tx}]$ associated with a number of transmitting antennas, $N_{Tx}$, (where the dimension is equal to the number of transmitting antennas in communication with the UE at the base station). $V^H$ may also denote a Hermitian transpose of V. Further, D may denote a diagonal eigenvalues matrix [$N_{Tx} \times N_L$] or a rectangular diagonal matrix with non-negative real numbers on the diagonal, where a diagonal matrix is a matrix in which the entries outside the main diagonal are all zero. An eigenvalue may be a scalar associated with a linear transformation of a vector space and having the property that there is some nonzero vector, which when multiplied by the scalar, is equal to the vector obtained by letting the transformation operate on the vector.

In some aspects, if a UE applies the whitening on a downlink signal precoded based on the example precoding, the whitened signal may be: $\tilde{\vec{y}} = \tilde{H}V\vec{x} + \vec{\eta} = WUD\vec{x} + \vec{\eta}$. An equalizer, such as a minimum mean squared error (MMSE) equalizer of the UE 402, may be: $C_{MMSE}^H = D^H U^H W^H (WUDD^H U^H W^H + I)^{-1} = (D^H U^H R_{nn}^{-1} UD + I)^{-1} D^H U^H W^H$, which may not cause a post equalization channel to be a diagonal channel (for example, $R_{nn}^{-1}$ causes the post equalization channel to be non-diagonal). A MMSE equalizer may be designed to be a filter that minimizes $E[|e|^2]$, where e is the error signal that may be equal to the output of the filter minus the transmitted signal.

Additionally, a diagonal channel may be a channel that has a channel response matrix with small (e.g., zero (0)) channel gains off of the diagonal. A diagonal channel may remove the inter-layer interference, which may result in an improved communication quality.

Figure 4:
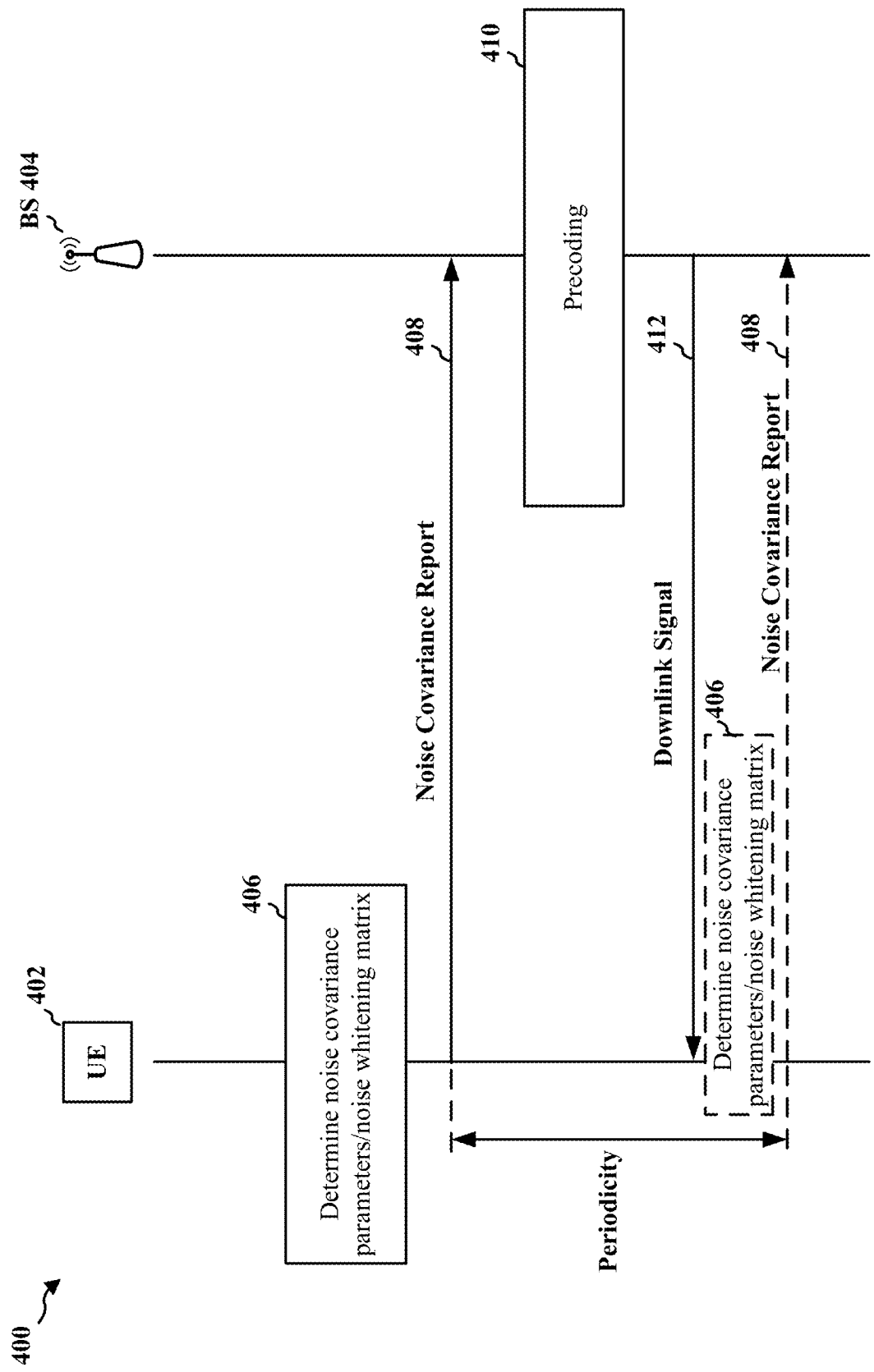
FIG. 4 is a diagram illustrating example communications between a UE and a base station.

FIG. 4 is a diagram illustrating example communications 400 between a UE 402 and a base station 404. At 406, the UE 402 may determine a noise whitening matrix for whitening or a set of noise covariance parameters based on the noise whitening matrix. The UE 402 may transmit a noise covariance report 408 that includes the set of noise covariance parameters or the noise whitening matrix to the base station 404. Based on the received noise covariance report 408, the base station 404 may precode (at 410), such as SVD precode, a downlink signal 412 on the whitened channel (e.g., the channel observed by the receiver of the UE after applying the noise whitening matrix) instead of the actual channel. For example, the precoder matrix may be set as $P = \tilde{V}$, where $\tilde{H} = \tilde{U}\tilde{D}\tilde{V}^H$.

After precoding the downlink signal 412, the base station may transmit the downlink signal 412 to the UE. The received and whitened downlink signal 412 after the precoding may be: $\tilde{\vec{y}} = \tilde{H}\tilde{V}\vec{x} + \vec{\eta} = \tilde{U}\tilde{D}\vec{x} + \vec{\eta}$. Therefore, an equalizer, such as a MMSE equalizer of the UE 402 may be: $\tilde{C}_{MMSE}^H = (\tilde{D}^H \tilde{U}^H \tilde{U}\tilde{D} + I)^{-1}\tilde{D}^H \tilde{U}^H = (\tilde{D}^H\tilde{D} + I)^{-1}\tilde{D}^H\tilde{H}^H$. Applying the MMSE equalizer on the received, whitened signal may produce: $\hat{\vec{x}} = \tilde{C}_{MMSE}^H \tilde{\vec{y}} = (\tilde{D}^H\tilde{D} + I)^{-1}\tilde{D}^H\tilde{U}^H\tilde{U}\tilde{D}\vec{x} + \tilde{C}_{MMSE}^H\vec{\eta} = G\vec{x} + \tilde{C}_{MMSE}^H\vec{\eta}$. The channel at the output of the equalizer $G = (\tilde{D}^H\tilde{D} + I)^{-1}\tilde{D}^H\tilde{D}$ may thus be a diagonal channel (for example, because $\tilde{D}^H, \tilde{D}$, and I are all diagonal). By using the whitened channel, i.e., the channel in which the UE 402's receiver observes after applying the whitening matrix, for precoding, the base station 404 may cause the equalized and whitened downlink signal 412 to be associated with a diagonal channel. The UE 402 may transmit the noise covariance report 408 to the base station 404 periodically and may re-determine the noise covariance parameters and the noise whitening matrix. The periodicity may be a number of slots, $N_{Rnn\ report\ period}$. For example, the number of slots, $N_{Rnn\ report\ period}$, may be 10 slots, 20 slots, or 100 slots in order to reduce overhead. In some aspects, the periodicity may be configured by the base station 404 and may be configured based on potential signaling overhead and a frequency in which the noise covariance changes. By utilizing the noise covariance report 408, the throughput of the communication between the base station 404 and the UE 402 may be improved, as the base station 404's precoding may likewise be improved. In addition, coverage for the UE 402 may be improved. The UE 402 may also be allowed to be equipped with a less complicated UE receiver because the inter-stream-interference is lower.

FIG. 5 is a diagram 500 illustrating an example noise covariance report. As illustrated in FIG. 5, an example noise covariance report may include a number of $R_{nn}$ blocks (e.g., $N_{blocks}$), a number of RBs at each block (e.g., $N_{RB\ per\ Block}$), a number of Rx antennas (e.g., $N_{Rx}$), and a report of each of the $N_{blocks}$. For example, the report of each of the $N_{blocks}$ may include a block k report (e.g., $R_{nn}(k)$) for each block.

Figure 6:
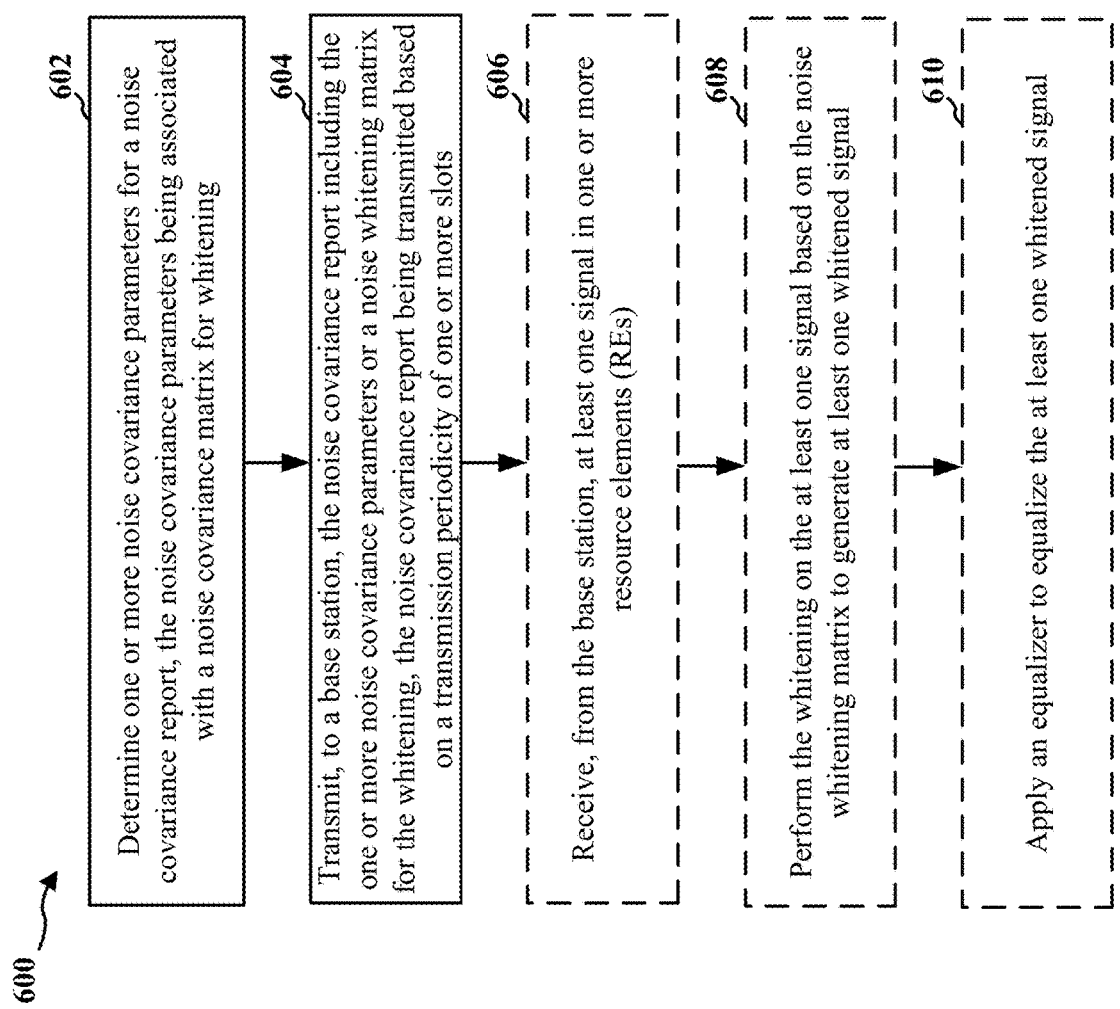
FIG. 6 is a flowchart of a method of wireless communication.

FIG. 6 is a flowchart 600 of a method of wireless communication. The method may be performed by a UE (e.g., the UE 104, the UE 402; the apparatus 802). Optional steps are illustrated in dashed lines. The steps are not necessarily illustrated in chronological order. The method may improve downlink precoding for a base station. In some aspects, the method may improve downlink precoding for a base station because the UE may report information related to the noise whitening matrix used for whitening a downlink signal to a base station; the base station may precode the downlink signal based on the reported information and may have a correct knowledge of the true equivalent channel that the UE's receiver observes.

At 602, the UE may determine one or more noise covariance parameters for a noise covariance report, the noise covariance parameters being associated with a noise covariance matrix for whitening. For example, at 406, UE 402 may determine one or more noise covariance parameters for a noise covariance report, the noise covariance parameters being associated with a noise covariance matrix for whitening. In some aspects, 602 may be performed by whitening determination component 842 in FIG. 8. In some aspects, the one or more noise covariance parameters indicate a plurality of noise covariance blocks associated with the noise covariance matrix. In some aspects, the one or more noise covariance parameters indicate one or more RBs per each noise covariance block of the plurality of noise covariance blocks associated with the noise covariance matrix. In some aspects, the one or more noise covariance parameters include a report of each noise covariance block of the plurality of noise covariance blocks. In some aspects, the one or more noise covariance parameters include one or more Rx antennas associated with the UE. In one example, the UE may determine the one or more noise covariance parameters and the noise covariance matrix based on a channel in which the UE anticipates signals to be received from.

At 604, the UE may transmit, to a base station, the noise covariance report including the one or more noise covariance parameters or a noise whitening matrix for the whitening, the noise covariance report being transmitted based on a transmission periodicity of one or more slots. In some aspects, 604 may be performed by reporting component 844 in FIG. 8. In some aspects, the noise covariance report includes the noise covariance matrix. In some aspects, the noise covariance report may correspond to the noise covariance report 408 in FIG. 4. In some aspects, the noise covariance report may be transmitted via UCI.

At 606, the UE may receive, from the base station, at least one signal in one or more REs. In some aspects, 606 may be performed by reception component 830 in FIG. 8. In some aspects, the at least one signal is precoded based on the noise covariance report. In some aspects, the precoding may be SVD precoded. In some aspects, the SVD precoding may include performing singular value decomposition on the whitened channel and setting a precoding matrix to be the inverse of the unitary matrix associated with the number of transmitting antennas of the base station that includes the right-singular vectors of a channel response matrix of the noise whitening matrix. In some aspects, the at least one signal may correspond to the downlink signal 412 in FIG. 4.

At 608, the UE may perform the whitening on the at least one signal based on the noise whitening matrix to generate at least one whitened signal. In some aspects, 608 may be performed by whitening component 846 in FIG. 8. In some aspects, the whitening may be accomplished by multiplying the at least one signal with the whitening matrix at a receiver of the UE before equalizing and decoding the signal. In some aspects, the whitening may mitigate noise associated with a channel in which the signal is received by uniforming an amplitude spectrum associated with the signal (by multiplying the at least one signal with the whitening matrix). In some aspects, the whitening may cause the noise covariance of the signal to be identity white. For example, a noise covariance of the signal may have a mean of zero. In some aspects, the at least one whitened signal is associated with at least one whitened channel. The whitened signal may be a noise-whitened signal where the effect of the noise from the channel is mitigated by the noise whitening matrix, which may result in a more uniform amplitude spectrum. The whitened channel may be the channel in which the UE's receiver observes after applying the whitening matrix. The whitened signal may have a noise covariance of a mean of zero.

At 610, the UE may apply an equalizer, such as a MMSE equalizer, to equalize the at least one whitened signal. In some aspects, 610 may be performed by equalization component 848 in FIG. 8. In some aspects, an output of the MMSE equalizer corresponds to at least one diagonal channel. A diagonal channel may be a channel that has a channel response matrix with small (e.g., 0) channel gains off the diagonal. The output of the MMSE equalizer may correspond to at least one diagonal channel because the at least one signal received was precoded (e.g., by a base station) based on the noise covariance report associated with the noise whitening matrix.

Figure 7:
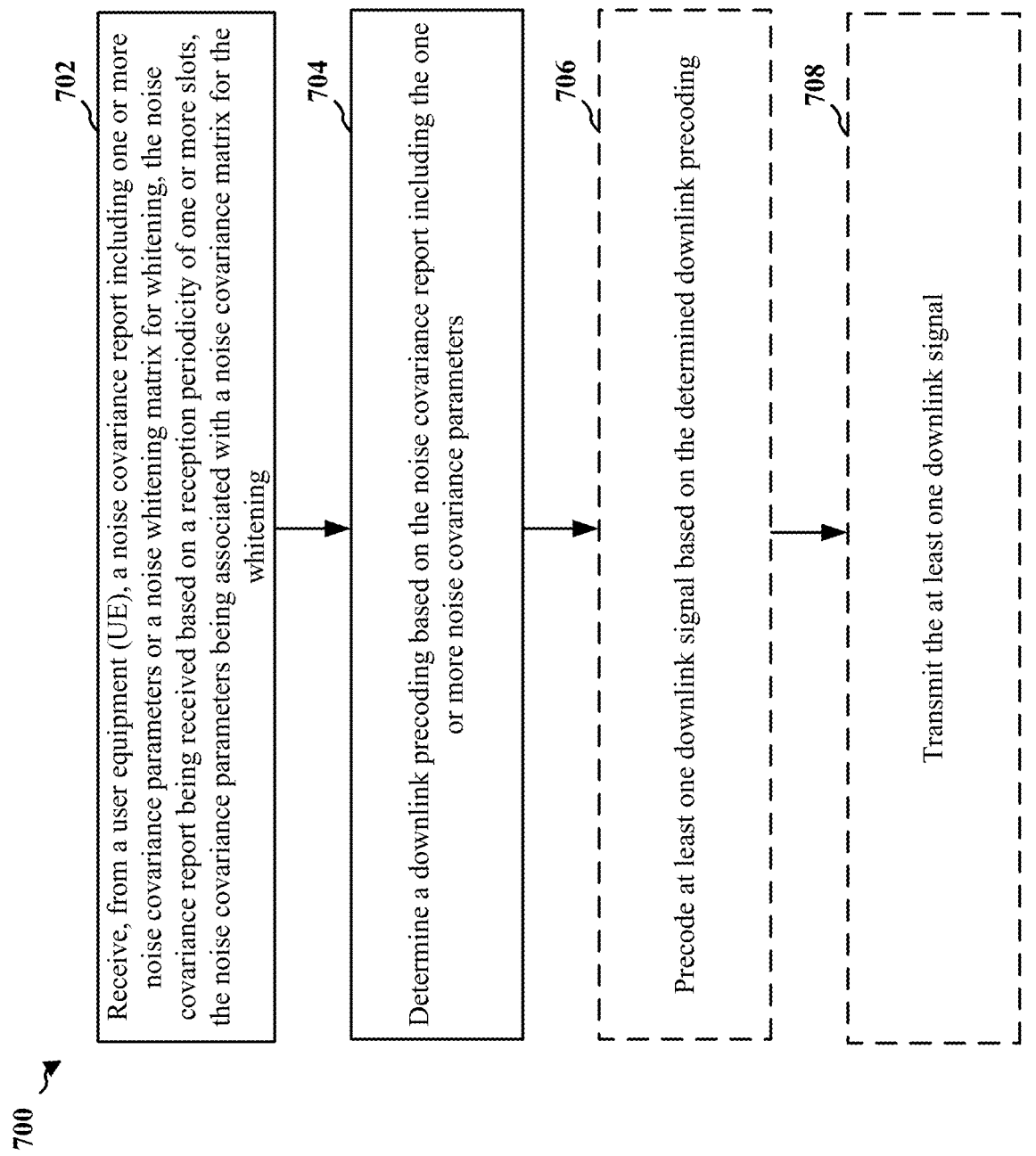
FIG. 7 is a flowchart of a method of wireless communication.

FIG. 7 is a flowchart 700 of a method of wireless communication. The method may be performed by a base station (e.g., the base station 102/180, the base station 404; the apparatus 902. Optional steps are illustrated in dashed lines. The steps are not necessarily illustrated in chronological order. The method may improve downlink precoding for a base station. In some aspects, the method may improve downlink precoding for a base station because the UE may report information related to the noise whitening matrix used for whitening a downlink signal to a base station; the base station may precode the downlink signal based on the reported information and may have a correct knowledge of the true equivalent channel that the UE's receiver observes.

At 702, the base station may receive, from a UE, a noise covariance report including one or more noise covariance parameters or a noise whitening matrix for whitening, the noise covariance report being received based on a reception periodicity of one or more slots, the noise covariance parameters being associated with a noise covariance matrix for the whitening. In some aspects, 702 may be performed by report processing component 942 in FIG. 9. In some aspects, the one or more noise covariance parameters indicate a plurality of noise covariance blocks associated with the noise covariance matrix. In some aspects, the one or more noise covariance parameters indicate one or more RBs per each noise covariance block of the plurality of noise covariance blocks associated with the noise covariance matrix. In some aspects, the one or more noise covariance parameters include a report of each noise covariance block of the plurality of noise covariance blocks. In some aspects, the one or more noise covariance parameters include one or more Rx antennas associated with the UE. In some aspects, the noise covariance report may be transmitted via UCI. In some aspects, the noise covariance report may correspond to the noise covariance report 408 in FIG. 4.

At 704, the base station may determine a downlink precoding based on the noise covariance report including the one or more noise covariance parameters. In some aspects, 704 may be performed by precoding determination component 944 in FIG. 9. In some aspects, the base station may determine the precoding by performing SVD precoding on a whitened channel (e.g., instead of an actual channel). In some aspects, the whitened channel may be the channel in which the UE's receiver observes after applying the noise whitening matrix. In some aspects, the SVD precoding may include performing singular value decomposition on the whitened channel and setting a precoding matrix to be the inverse of the unitary matrix that includes the right-singular vectors of a channel response matrix of the noise whitening matrix.

At 706, the base station may precode at least one downlink signal based on the determined downlink precoding. In some aspects, 706 may be performed by precoding component 946 in FIG. 9. In some aspects, the precoding may be SVD precoding based on the received noise covariance report.

At 708, the base station may transmit the at least one downlink signal. In some aspects, 708 may be performed by transmission component 934 in FIG. 9. In some aspects, the at least one downlink signal may be the downlink signal 412 in FIG. 4. In some aspects, the base station may anticipate the UE to process the downlink signal in accordance with the noise covariance report (e.g., whitening the downlink signal based on the noise whitening matrix associated with the noise covariance report).

Figure 8:
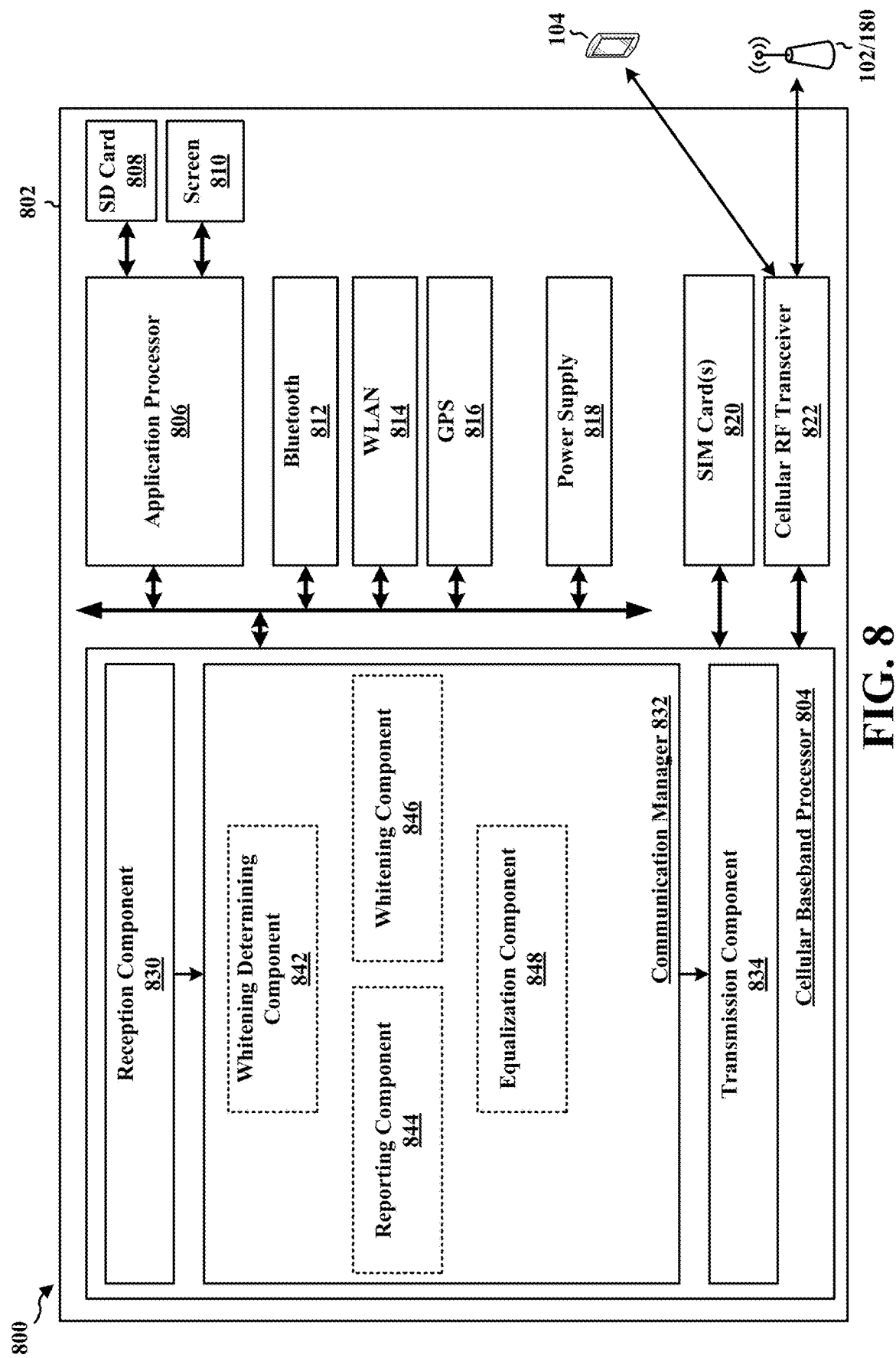
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. In some aspects, the reception component 830 may be configured to receive, from a base station, at least one signal in one or more REs, e.g., as described in connection with 606 of FIG. 6. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

The communication manager 832 may include a whitening determining component 842 that may be configured to determine one or more noise covariance parameters for a noise covariance report, the noise covariance parameters being associated with a noise covariance matrix for whitening, e.g., as described in connection with 602 in FIG. 6. The communication manager 832 may further include a reporting component 844 that may be configured to transmit, to a base station, the noise covariance report including the one or more noise covariance parameters or a noise whitening matrix for the whitening, the noise covariance report being transmitted based on a transmission periodicity of one or more slots, e.g., as described in connection with 604 in FIG. 6. The communication manager 832 may further include a whitening component 846 that may be configured to perform the whitening on the at least one signal based on the noise whitening matrix to generate at least one whitened signal, e.g., as described in connection with 608 in FIG. 6. The communication manager 832 may further include an equalization component 848 that may be configured to apply an equalizer to equalize the at least one whitened signal, e.g., as described in connection with 610 in FIG. 6.

The apparatus may include additional components that perform each of the blocks of the algorithm in the aforementioned flowchart of FIG. 6. As such, each block in the aforementioned flowcharts of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for determining one or more noise covariance parameters for a noise covariance report, the noise covariance parameters being associated with a noise covariance matrix for whitening. The cellular baseband processor 804 may further include means for transmitting, to a base station, the noise covariance report including the one or more noise covariance parameters or a noise whitening matrix for the whitening, the noise covariance report being transmitted based on a transmission periodicity of one or more slots. The cellular baseband processor 804 may further include means for receiving, from the base station, at least one signal in one or more REs. The cellular baseband processor 804 may further include means for performing the whitening on the at least one signal based on the noise whitening matrix to generate at least one whitened signal. The cellular baseband processor 804 may further include means for applying an equalizer to equalize the at least one whitened signal.

The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

FIG. 9 is a diagram 900 illustrating an example of a hardware implementation for an apparatus 902. The apparatus 902 is a BS and includes a baseband unit 904. The baseband unit 904 may communicate through a cellular RF transceiver 922 with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. In some aspects, the transmission component 934 may be configured to transmit at least one precoded downlink signal to a UE, e.g., as described in connection with 708 in FIG. 7. The communication manager 932 includes the one or more illustrated components. The components within the communication manager 932 may be stored in the computer-readable medium/memory and/or configured as hardware within the baseband unit 904. The baseband unit 904 may be a component of the BS 310 and may include the memory 376 and/or at least one of the TX processor 316, the RX processor 370, and the controller/processor 375.

The communication manager 932 may include a report processing component 942 that may be configured to receive, from a UE, a noise covariance report including one or more noise covariance parameters or a noise whitening matrix for whitening, the noise covariance report being received based on a reception periodicity of one or more slots, the noise covariance parameters being associated with a noise covariance matrix for the whitening, e.g., as described in connection with 702 in FIG. 7. The communication manager 932 may further include a precoding determination component 944 that may be configured to determine a downlink precoding based on the noise covariance report including the one or more noise covariance parameters, e.g., as described in connection with 704 in FIG. 7. The communication manager 932 may further include a precoding component 946 that may be configured to precode at least one downlink signal based on the determined downlink precoding, e.g., as described in connection with 706 in FIG. 7.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for receiving, from a UE, a noise covariance report including one or more noise covariance parameters or a noise whitening matrix for whitening, the noise covariance report being received based on a reception periodicity of one or more slots, the noise covariance parameters being associated with a noise covariance matrix for the whitening. The baseband unit 904 may further include means for determining a downlink precoding based on the noise covariance report including the one or more noise covariance parameters. The baseband unit 904 may further include means for precoding at least one downlink signal based on the determined downlink precoding. The baseband unit 904 may further include means for transmitting the at least one downlink signal.

The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: determining one or more noise covariance parameters for a noise covariance report, the noise covariance parameters being associated with a noise covariance matrix for whitening; and transmitting, to a base station, the noise covariance report including the one or more noise covariance parameters or a noise whitening matrix for the whitening, the noise covariance report being transmitted based on a transmission periodicity of one or more slots.

Aspect 2 is the method of aspect 1, wherein the one or more noise covariance parameters indicate a plurality of noise covariance blocks associated with the noise covariance matrix.

Aspect 3 is the method of any of aspects 1-2, wherein the one or more noise covariance parameters indicate one or more RBs per each noise covariance block of the plurality of noise covariance blocks associated with the noise covariance matrix.

Aspect 4 is the method of any of aspects 1-3, wherein the one or more noise covariance parameters include a report of each noise covariance block of the plurality of noise covariance blocks.

Aspect 5 is the method of any of aspects 1-4, wherein the noise covariance report includes the noise covariance matrix.

Aspect 6 is the method of any of aspects 1-5, further comprising: receiving, from the base station, at least one signal in one or more REs; and performing the whitening on the at least one signal based on the noise whitening matrix to generate at least one whitened signal, the whitened signal having a noise covariance of a mean of zero.

Aspect 7 is the method of any of aspects 1-6, wherein the at least one signal is precoded based on the noise covariance report.

Aspect 8 is the method of any of aspects 1-7, wherein the at least one signal is SVD precoded.

Aspect 9 is the method of any of aspects 1-8, wherein the at least one whitened signal is associated with at least one whitened channel.

Aspect 10 is the method of any of aspects 1-9, further comprising: applying an equalizer to equalize the at least one whitened signal.

Aspect 11 is the method of any of aspects 1-10, wherein the equalizer is a MMSE equalizer.

Aspect 12 is the method of any of aspects 1-11, wherein the whitening comprises multiplying the at least one signal with the whitening matrix at a receiver of the UE before equalizing or decoding the signal.

Aspect 13 is the method of any of aspects 1-12, wherein the one or more noise covariance parameters include one or more Rx antennas associated with the UE.

Aspect 14 is the method of any of aspects 1-13, wherein the noise covariance report is transmitted via UCI.

Aspect 15 is a method of wireless communication at a base station, comprising: receiving, from a UE, a noise covariance report including one or more noise covariance parameters or a noise whitening matrix for whitening, the noise covariance report being received based on a reception periodicity of one or more slots, the noise covariance parameters being associated with a noise covariance matrix for the whitening; and determining a downlink precoding based on the noise covariance report including the one or more noise covariance parameters.

Aspect 16 is the method of aspect 15, wherein the one or more noise covariance parameters indicate a plurality of noise covariance blocks associated with the noise covariance matrix.

Aspect 17 is the method of any of aspects 15-16, wherein the one or more noise covariance parameters indicate one or more RBs per each noise covariance block of the plurality of noise covariance blocks associated with the noise covariance matrix.

Aspect 18 is the method of any of aspects 15-17, wherein the one or more noise covariance parameters include a report of each noise covariance block of the plurality of noise covariance blocks.

Aspect 19 is the method of any of aspects 15-18, wherein the noise covariance report includes the noise covariance matrix.

Aspect 20 is the method of any of aspects 15-19, further comprising: precoding at least one downlink signal based on the determined downlink precoding.

Aspect 21 is the method of any of aspects 15-20, wherein the downlink precoding is a SVD precoding.

Aspect 22 is the method of any of aspects 15-21, wherein the one or more noise covariance parameters include one or more Rx antennas associated with the UE.

Aspect 23 is the method of any of aspects 15-22, wherein the noise covariance report is received via UCI.

Aspect 24 is an apparatus for wireless communication including at least one processor coupled to a memory and configured to implement a method as in any of aspects 1 to 14.

Aspect 25 is an apparatus for wireless communication including at least one processor coupled to a memory and configured to implement a method as in any of aspects 15 to 22.

Aspect 26 is an apparatus for wireless communication including means for implementing a method as in any of aspects 1 to 14.

Aspect 27 is an apparatus for wireless communication including means for implementing a method as in any of aspects 15 to 22.

Aspect 28 is a computer-readable medium storing computer executable code, where the code when executed by a processor causes the processor to implement a method as in any of aspects 1 to 14.

Aspect 29 is a computer-readable medium storing computer executable code, where the code when executed by a processor causes the processor to implement a method as in any of aspects 15 to 22.

What is claimed is:

1. A method of wireless communication of a user equipment (UE), comprising:
    determining one or more noise covariance parameters for a noise covariance report, the one or more noise covariance parameters being associated with a noise covariance matrix for whitening;
    transmitting, to a base station, the noise covariance report including the one or more noise covariance parameters or a noise whitening matrix for the whitening, the noise covariance report being transmitted periodically based on a transmission periodicity of one or more slots; and
    receiving, from the base station, at least one signal, the at least one signal being precoded based on at least one whitened channel, the at least one whitened channel being associated with the one or more noise covariance parameters or the noise whitening matrix for the whitening.

2. The method of claim 1, wherein the one or more noise covariance parameters indicate a plurality of noise covariance blocks associated with the noise covariance matrix.

3. The method of claim 2, wherein the one or more noise covariance parameters indicate one or more resource blocks (RBs) per each noise covariance block of the plurality of noise covariance blocks associated with the noise covariance matrix.

4. The method of claim 2, wherein the one or more noise covariance parameters include a report of each noise covariance block of the plurality of noise covariance blocks.

5. The method of claim 2, wherein the noise covariance report includes the noise covariance matrix.

6. The method of claim 2, wherein the at least one signal is received from the base station in one or more resource elements (REs), and the method further comprises:
    performing the whitening on the at least one signal based on the noise whitening matrix to generate at least one whitened signal, the at least one whitened signal having a noise covariance of a mean of zero.

7. The method of claim 6, wherein the at least one signal is precoded based on the noise covariance report.

8. The method of claim 6, wherein the at least one signal is singular value decomposition (SVD) precoded.

9. The method of claim 6, wherein the at least one whitened signal is associated with the at least one whitened channel.

10. The method of claim 6, further comprising:
    applying an equalizer to equalize the at least one whitened signal.

11. The method of claim 10, wherein the equalizer is a minimum mean squared error (MMSE) equalizer.

12. The method of claim 6, wherein the whitening comprises multiplying the at least one signal with the noise whitening matrix at a receiver of the UE before equalizing or decoding the at least one signal.

13. The method of claim 1, wherein the one or more noise covariance parameters include one or more reception (Rx) antennas associated with the UE.

14. The method of claim 1, wherein the noise covariance report is transmitted via uplink channel information (UCI).

15. A method of wireless communication of a base station, comprising:
    receiving, from a user equipment (UE), a noise covariance report including one or more noise covariance parameters or a noise whitening matrix for whitening, the noise covariance report being received periodically based on a reception periodicity of one or more slots, the one or more noise covariance parameters being associated with a noise covariance matrix for the whitening; and determining a downlink precoding based on at least one whitened channel, the at least one whitened channel being associated with the one or more noise covariance parameters or the noise whitening matrix for the whitening.

16. The method of claim 15, wherein the one or more noise covariance parameters indicate a plurality of noise covariance blocks associated with the noise covariance matrix.

17. The method of claim 16, wherein the one or more noise covariance parameters indicate one or more resource blocks (RBs) per each noise covariance block of the plurality of noise covariance blocks associated with the noise covariance matrix.

18. The method of claim 16, wherein the one or more noise covariance parameters include a report of each noise covariance block of the plurality of noise covariance blocks.

19. The method of claim 16, wherein the noise covariance report includes the noise covariance matrix.

20. The method of claim 15, further comprising:
precoding at least one downlink signal based on the determined downlink precoding.

21. The method of claim 20, wherein the downlink precoding is a singular value decomposition (SVD) precoding.

22. The method of claim 15, wherein the one or more noise covariance parameters include one or more reception (Rx) antennas associated with the UE.

23. The method of claim 15, wherein the noise covariance report is received via uplink channel information (UCI).

24. An apparatus for wireless communication of a user equipment (UE), comprising:
a memory; and
at least one processor coupled to the memory and configured to:
determine one or more noise covariance parameters for a noise covariance report, the one or more noise covariance parameters being associated with a noise covariance matrix for whitening;
transmit, to a base station, the noise covariance report including the one or more noise covariance parameters or a noise whitening matrix for the whitening, the noise covariance report being transmitted periodically based on a transmission periodicity of one or more slots; and
receive, from the base station, at least one signal, the at least one signal being precoded based on at least one whitened channel, the at least one whitened channel being associated with the one or more noise covariance parameters or the noise whitening matrix for the whitening.

25. The apparatus of claim 24, wherein the one or more noise covariance parameters include a plurality of noise covariance blocks associated with the noise covariance matrix.

26. The apparatus of claim 25, wherein the one or more noise covariance parameters include one or more resource blocks (RBs) per each noise covariance block of the plurality of noise covariance blocks associated with the noise covariance matrix.

27. The apparatus of claim 25, wherein the one or more noise covariance parameters include a report of each noise covariance block of the plurality of noise covariance blocks.

28. The apparatus of claim 25, wherein the at least one signal is received from the base station in one or more resource elements (REs), and the at least one processor coupled to the memory is further configured to:
perform the whitening on the at least one signal based on the noise whitening matrix to generate at least one whitened signal.

29. The apparatus of claim 28, wherein the at least one signal is precoded based on the noise covariance report.

30. An apparatus for wireless communication of a base station, comprising:
a memory; and
at least one processor coupled to the memory and configured to:
receive, from a user equipment (UE), a noise covariance report including one or more noise covariance parameters or a noise whitening matrix for whitening, the noise covariance report being received periodically based on a reception periodicity of one or more slots, the one or more noise covariance parameters being associated with a noise covariance matrix for the whitening; and
determine a downlink precoding based on at least one whitened channel, the at least one whitened channel being associated with the one or more noise covariance parameters or the noise whitening matrix for the whitening.

* * * * *